United States Patent
Nguyen et al.

(10) Patent No.: US 11,057,854 B2
(45) Date of Patent: Jul. 6, 2021

(54) SYNCHRONIZATION FOR V2X CARRIER AGGREGATION

(71) Applicant: QUALCOMM Incorporated, San Diego, CA (US)

(72) Inventors: Tien Viet Nguyen, Bedminster, NJ (US); Kapil Gulati, Dover, DE (US); Sudhir Kumar Baghel, Hillsborough, NJ (US); Shailesh Patil, San Diego, CA (US); Libin Jiang, Bridgewater, NJ (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 16/156,874

(22) Filed: Oct. 10, 2018

(65) Prior Publication Data

US 2019/0159150 A1    May 23, 2019

Related U.S. Application Data (60) Provisional application No. 62/588,036, filed on Nov. 17, 2017.

(51) Int. Cl.
*H04W 56/00* (2009.01)
*H04W 4/46* (2018.01)
(Continued)

(52) U.S. Cl.
CPC ......... *H04W 56/0015* (2013.01); *H04W 4/46* (2018.02); *H04W 4/70* (2018.02);
(Continued)

(58) Field of Classification Search
CPC ....... H04W 76/14; H04W 4/40; H04W 72/04; H04W 72/0446; H04W 72/02
See application file for complete search history.

(56) References Cited

U.S. PATENT DOCUMENTS 10,517,110 B2 * 12/2019 Dinan ............... H04W 4/70
2017/0289934 A1   10/2017 Sheng et al.
(Continued)

FOREIGN PATENT DOCUMENTS

EP    3322234 A1    5/2018
EP    3373606 A1    9/2018
(Continued)

OTHER PUBLICATIONS

Ericsson: "On Synchronization Aspects for PC5 CA", 3GPP Draft; R1-1717731 on Synchronization Aspects for PC5 CA, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017 Oct. 8, 2017, XP051340916, Retrieved from the Internet: URL:http://www.3gpp.org/ftp/Meetings_3GPP_SYNC/RAN1/Docs/ [retrieved on Oct. 8, 2017], 2 pages.
(Continued)

*Primary Examiner* — Jung H Park
(74) *Attorney, Agent, or Firm* — Arent Fox, LLP (57) ABSTRACT

Features of the present disclosure implementing techniques that allow the user equipment (UE) to autonomously (e.g., without the network control) manage timing synchronization of a plurality of carriers using sidelink synchronization signal (SLSS) from one or more other UEs in order to identify a synchronization source. A synchronization source associated with a frequency carrier from a set of frequency carriers may be selected according to one or more SLSS sync source selection techniques or rules. For instance, the described solution may be utilized to enable UEs to autonomously perform V2X carrier aggregation (CA). In some examples, the synchronization carrier(s) to be searched may be determined based on the SLSS capability of the UE (e.g., transmission and reception of SLSS capabilities of the UE).

30 Claims, 4 Drawing Sheets

(51) Int. Cl.
  *H04W 4/70* (2018.01)
  *H04W 76/14* (2018.01)
  *H04W 76/27* (2018.01)
  *H04W 72/04* (2009.01)
  *H04W 72/10* (2009.01)
  *H04W 4/80* (2018.01)
  *H04W 48/00* (2009.01)
  *H04W 4/06* (2009.01)
  *H04W 4/40* (2018.01)

(52) U.S. Cl.
  CPC ..... *H04W 56/002* (2013.01); *H04W 72/0453* (2013.01); *H04W 72/10* (2013.01); *H04W 76/14* (2018.02); *H04W 76/27* (2018.02); *H04W 4/06* (2013.01); *H04W 4/40* (2018.02); *H04W 4/80* (2018.02); *H04W 48/00* (2013.01)

(56) References Cited

U.S. PATENT DOCUMENTS

| | | | | |
|---|---|---|---|---|
| 2018/0098322 A1* | 4/2018 | Yoon | | H04W 72/042 |
| 2018/0332564 A1* | 11/2018 | Lee | | H04W 72/02 |
| 2019/0045465 A1* | 2/2019 | Lee | | H04W 72/04 |
| 2019/0075548 A1* | 3/2019 | Lee | | H04W 52/383 |
| 2019/0141647 A1* | 5/2019 | Nimbalker | | H04L 5/001 |
| 2019/0364585 A1* | 11/2019 | Lee | | H04W 72/12 |
| 2020/0053675 A1* | 2/2020 | Khoryaev | | H04W 56/002 |

FOREIGN PATENT DOCUMENTS

| | | | | |
|---|---|---|---|---|
| WO | 2017007285 A1 | 1/2017 | | |
| WO | 2017076190 A1 | 5/2017 | | |
| WO | WO-2017176099 A1 * | 10/2017 | ............ | H04W 74/08 |

OTHER PUBLICATIONS

Intel Corporation: "Synchronization Aspects for LTE V2V Sidelink Carrier Aggregation", 3GPP Draft; R1-1717331—Intel—V2X_SLCA_SYNC, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017 Oct. 8, 2017, XP051340521, Retrieved from the Internet: URL:http://www.3gpp.org/ftp/Meetings_3GPP_Sync/RAN1/Docs/ [retrieved on Oct. 8, 2017], 3 pages.

International Search Report and Written Opinion—PCT/US2018/055421—ISA/EPO—Dec. 12, 2018.

Qualcomm Incorporated: "Synchronization for V2X PC5 Carrier Aggregation", 3GPP Draft; R2-1805661—CA_Synchronization, 3rd Generation Partnership Project (3GPP), Mobile Competence Centre; 650, Route Des Lucioles; F-06921 Sophia-Antipolis Cedex; France, vol. RAN WG2, No. Sanya, China; Apr. 16, 2018-Apr. 20, 2018 Apr. 14, 2018, XP051429296, Retrieved from the Internet: URL:http:f/www.3gpp.org/ftp/Meetings%5F3GPP%5FSYNC/RAN2/Docs/ [retrieved on Apr. 14, 2018], 5 pages.

* cited by examiner

SYNCHRONIZATION FOR V2X CARRIER AGGREGATION

CROSS-REFERENCE TO RELATED APPLICATION(S)

This application claims benefit of U.S. Provisional Application Ser. No. 62/588,036, entitled "SYNCHRONIZATION FOR V2X CARRIER AGGREGATION" and filed Nov. 17, 2017, which is expressly incorporated by reference herein in its entirety.

BACKGROUND

The present disclosure relates generally to communication systems, and more particularly, to synchronizing timing of a plurality of carriers to enable vehicle-to-anything (V2X) carrier aggregation (CA) for user equipment (UE).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

One such need for improvement relates to management of time synchronization between different carriers that may be employed to establish communication between a plurality of UEs. For multiple carrier operations such as CA, conventional UEs have limited capability (e.g., processor) to manage different timelines associated with different carriers, particularly if such timelines are not synchronized. Thus, traditional systems such as LTE generally rely on network control to manage the timing of different CA carriers on behalf of the UE. Reliance on network control, however, is not always feasible. Indeed, in some wireless system communication scenarios, such as V2X in LTE or in 5G NR, there may be no network control with respect to management of CA carriers. As such, the UEs may be expected to manage communication autonomously without any network involvement as it relates to management of time synchronization of multiple carriers. Thus, conventional systems that rely on network control may be ill-equipped to function in such scenarios.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Features of the present disclosure address the above-identified problem by implementing techniques that allow the UE to autonomously (e.g., without the network control) manage timing synchronization of a plurality of carriers using sidelink synchronization signal (SLSS) from one or more other UEs in order to identify a synchronization source. To that end, in an aspect of the disclosure, a method, a computer-readable medium, and an apparatus are provided for wireless communication.

In one example, a method for wireless communications is disclosed. The method may include identifying a set of synchronization carriers that are configured for a first UE. The method may further include identifying, at the first UE, one or more frequency carriers used to establish communication with one or more second UEs. The method may further include determining a subset of synchronization carriers from the set of synchronization carriers based on identification of the one or more frequency carriers used to establish communication between the first UE and the one or more second UEs. The method may further comprise determining a synchronization source associated with each synchronization carrier in the subset of synchronization carriers. The method may further comprise establishing communication between the first UE and the one or more second UEs over the one or more frequency carriers based on a timing and frequency synchronization provided by the synchronization source.

In another example, a UE for wireless communications is disclosed. The UE may include a processor and a memory in communication with the processor. The memory may include instructions executable by the processor to identifying a set of synchronization carriers that are configured for a first UE. The instructions may further be executable by the processor to identify, at the first UE, one or more frequency carriers used to establish communication with one or more second UEs. The UE may further include instructions executable by the processor to determine a subset of synchronization carriers from the set of synchronization carriers based on identification of the one or more frequency carriers used to establish communication between the first UE and the one or more second UEs. The UE may further include instructions executable by the processor to determine a synchronization source associated with each synchronization carrier in the subset of synchronization carriers. The UE may further include instructions executable by the processor to establish communication between the first UE and the one or more second UEs over the one or more frequency carriers based on a timing and frequency synchronization provided by the synchronization source.

In another example, a computer readable medium for wireless communication is disclosed. The computer readable medium may include code for identifying a set of synchronization carriers that are configured for a first UE. The computer readable medium may further include code for identifying, at the first UE, one or more frequency carriers used to establish communication with one or more second UEs. The computer readable medium may further include code for determining a subset of synchronization carriers from the set of synchronization carriers based on identification of the one or more frequency carriers used to establish communication between the first UE and the one or more second UEs. The computer readable medium may further include code for determining a synchronization source associated with each synchronization carrier in the subset of synchronization carriers. The computer readable medium may further include code for establishing communication between the first UE and the one or more second UEs over the one or more frequency carriers based on a timing and frequency synchronization provided by the synchronization source.

In another example, an apparatus for wireless communication is disclosed. The apparatus may include means for identifying a set of synchronization carriers that are configured for a first UE. The apparatus may further include means for identifying, at the first UE, one or more frequency carriers used to establish communication with one or more second UEs. The apparatus may further include means for determining a subset of synchronization carriers from the set of synchronization carriers based on identification of the one or more frequency carriers used to establish communication between the first UE and the one or more second UEs. The apparatus may further include means for determining a synchronization source associated with each synchronization carrier in the subset of synchronization carriers. The apparatus may further include means for establishing communication between the first UE and the one or more second UEs over the one or more frequency carriers based on a timing and frequency synchronization provided by the synchronization source.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

As discussed above, conventional systems generally rely on network control to manage the timing of different CA carriers on behalf of the UE. Reliance on network control, however, is not always feasible. Indeed, in some wireless system communication scenarios, such as V2X in LTE or 5G NR, there may be no network control with respect to management of CA carriers. Also, in such scenarios, UE capability to maintain multiple different timelines may be limited. For example, if the maximum number of different timelines that the UE can maintain is two (2), then that UE may be limited to only support up to two carriers if those carriers are not synchronized. Such limitations may hamper the ability of the UE to maximize available bandwidth resources (e.g., multiple additional carriers or carrier aggregation).

Features of the present disclosure may solve one or more aspects of the above-identified problem by implementing techniques that allow the UE to establish communication between the UE and one or more second UEs over a set of frequency carriers based on timing and frequency synchronization provided by a synchronization source (e.g., another UE) associated with a synchronization carrier. A synchronization source associated with a frequency carrier from a set of frequency carriers may be selected according to one or more SLSS sync source selection techniques or rules. For instance, the described solution may be utilized to enable UEs to autonomously perform V2X CA. In some examples, the synchronization carrier(s) to be searched may be determined based on the SLSS capability of the UE (e.g., transmission and reception of SLSS capabilities of the UE). As such, in some aspects, SLSS signals transmitted by one or more other UEs may be associated with a synchronization source (e.g., a UE that may provide timing and frequency synchronization) to enable the receiving UE to autonomously (e.g., without any, or with minimum, network involvement) manage synchronization of a plurality of carriers for communication with the one or more other UEs. To that end, in order to keep the number of different timings within the aggregated carriers to a minimal number, the carriers may be partitioned (or divided) into a different groups of carriers that may be continuous or disjointed carriers in the spectrum. Within each group of carriers, a single synchronization source or reference may be used to synchronize timing and frequency of the group of carriers.

In some aspects, the synchronization reference for V2X CA may be based on a global navigation satellite system (GNSS), base station, or an SLSS signal transmitted by other UEs in the network. If the UE is in communication with the GNSS, the UE may prioritize the timing synchronization for CA based on timing and frequency configuration received from the base station However, in some instances the UE may be unable to establish communication with the GNSS (e.g., when the UE is underground and does not have a signal to GNSS), the UE may need to identify a synchronization source ("sync source") in order to manage timing and frequency of multiple carriers based on the synchronization reference. In some examples, the sync source may be another UE on the network that is in direct or indirect communication with GNSS or a UE that is capable of both receiving and transmitting SLSS (but not in sync with GNSS). In either of these latter two examples, the UE is using the SLSS transmission in a selected carrier of the other UE to synchronize timing within a group of carriers transmitted by the other UE, and the selected carrier may be based on the synchronization source.

Identification of the sync source may be based on the SLSS capabilities of the UE. For example, where the UE is capable of SLSS reception (Rx) or transmission (Tx), the UE may be configured to tune to a synchronization search carrier or sync search carrier, which is one of the carriers configured for both reception and transmission, to identify a synchronization source that may provide a timing synchronization reference signal to allow the UE to manage timing and frequency of a plurality of carriers in a group. Alternatively, if the UE is capable of SLSS Rx only, then the sync search carrier may be one of the carriers on which the UE is configured to receive SLSS.

In some examples, identification of which of the plurality of carriers the UE should search for SLSS (e.g., the sync search carrier(s)) and select as the sync carrier may be based on one or more of following techniques:

First, if the UE is able to perform sync source selection for only one carrier (e.g., anchor sync carrier), then that carrier may be pre-configured or network configured such that all UEs on the network may listen to the same carrier for SLSS signal;

Second, in some situations where the UE may be configured to receive a given carrier, then a tune away gap and detection delay requirements may be defined to allow the UE that is not configured to receive (and transmit) in the anchor sync carrier to tune the Rx chain to the anchor carrier to perform SLSS detection, e.g., to support an inter-frequency SLSS selection/reselection procedure during the tune away gaps to find a higher priority sync source; and Third, the UE may loop through all available carriers in the plurality of carriers to identify the highest priority synchronization source based on sync source selection priority rules that are either pre-configured or established by the network. Once a synchronization source is chosen in a given carrier, the UE may keep reselecting a higher priority sync source within that carrier. Only when the sync source is lost and there is no available fall back sync source would the UE again loop through all available carriers.

With respect to the third option identified above, the priority for the sync source carriers may be set such that the UE may loop through the available carriers in the priority order that is established. As such, if a suitable sync source is found in a carrier with higher priority, the UE may not need to loop through lower priority carriers and may conserve available resources that prevent the UE from having to loop through lower priority carriers.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
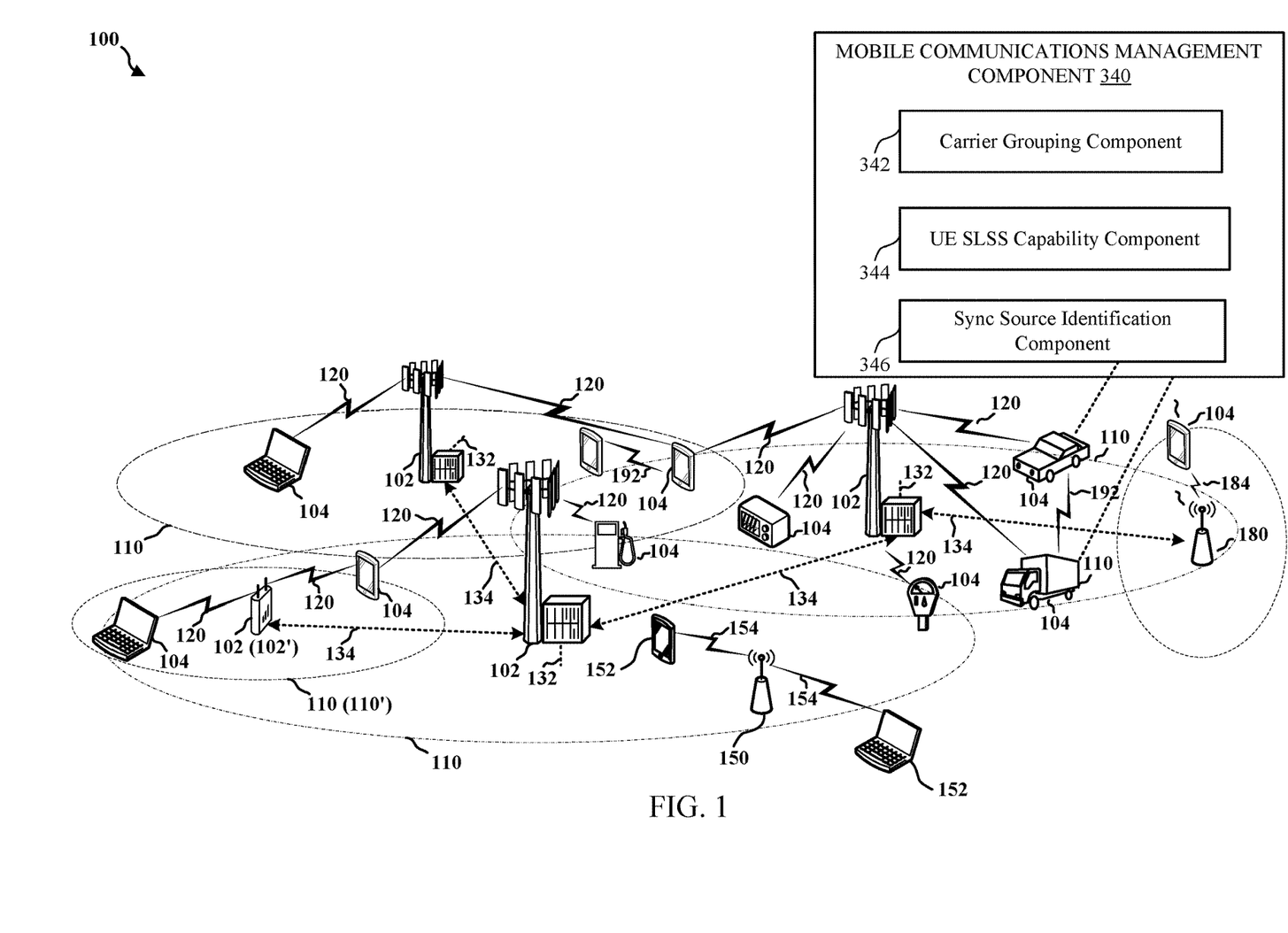
FIG. 1 is a diagram illustrating an example of a wireless communications system and an access network.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) The one or more UEs 104 may include a mobile communication component 240 to perform one or more methods (e.g., method 400) to support timing and frequency synchronization within a set of communication carriers of a group based on an associated synchronization source, e.g., a selected carrier within the set of carriers of the group identified according to one or more SLSS sync source selection techniques or rules. The components and subcomponents of the mobile communication management component 240 is described in detail with reference to FIG. 2 below. Thus, in some implementations, the UEs 104 associated with vehicles 110 may operate the mobile communication component 240 to synchronize timing within one or more grouped sets of carriers, thereby enabling UEs to autonomously perform V2X CA.

The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110'. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC may include a Mobility Management Entity (MME), other MMEs, a Serving Gateway, a Multimedia Broadcast Multicast Service (MBMS) Gateway, a Broadcast Multicast Service Center (BM-SC), and a Packet Data Network (PDN) Gateway. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Thus, as noted above, the UE 104 may be configured to enable a vehicle 110 to vehicle 110 communication with autonomous CA using SLSS for timing synchronization within the group of carriers being aggregated, e.g., where the UE 104 may be unable to communicate with GNSS to acquire timing and frequency synchronization for a plurality of carriers. In such situations, the UE 104 may tune to one or more sync search carriers (e.g., anchor sync carrier) in order to search for a synch source to autonomously synchronize the timing within the group of carriers.

Figure 2:
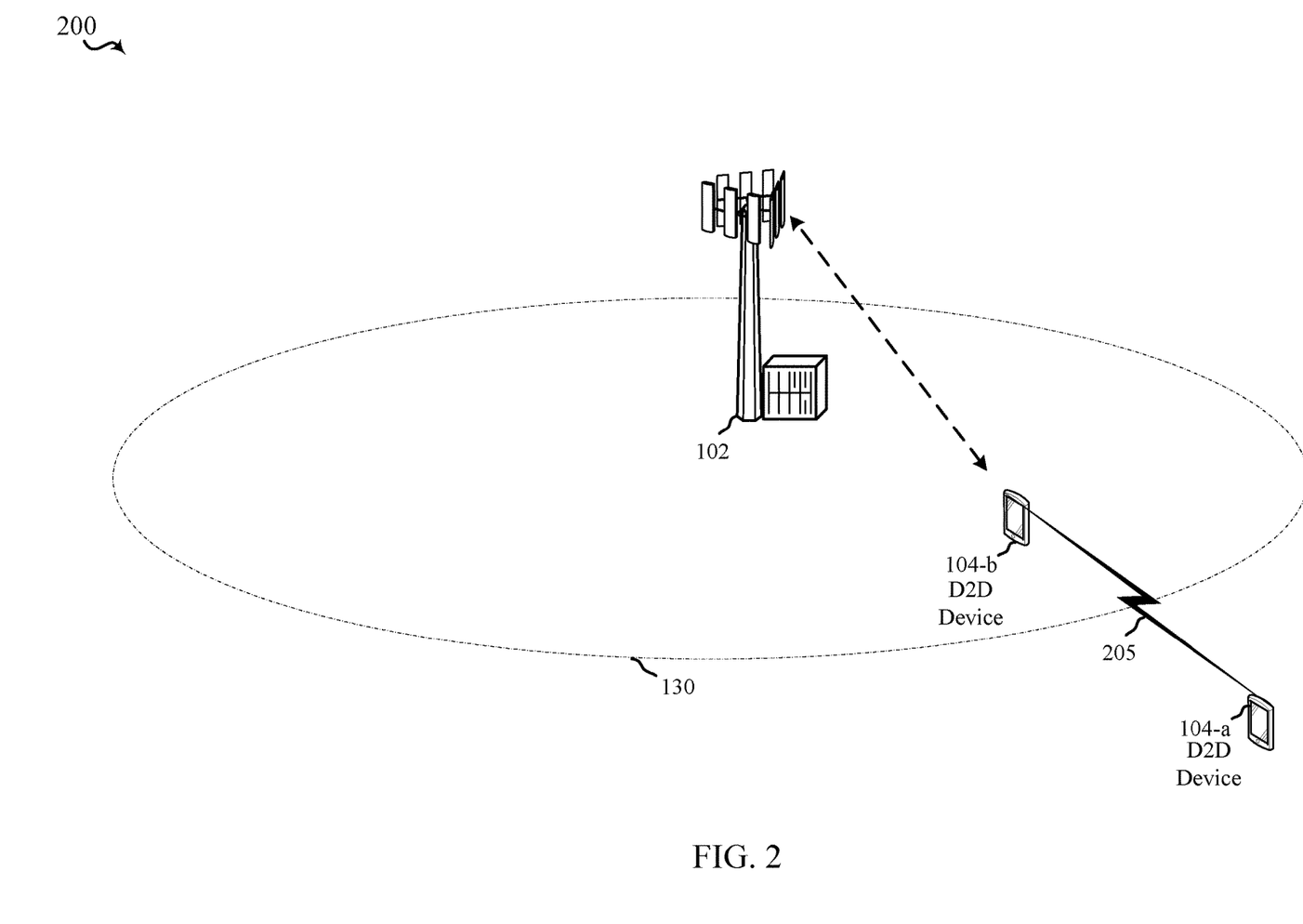
FIG. 2 is an example schematic diagram of side link communication between a plurality of UEs in accordance with aspects of the present disclosure.

FIG. 2 is a schematic diagram 200 of synchronizing one or more UEs 104 involved in D2D communication. As noted above, conventional systems generally rely on network control (e.g., timing information provided by base station 102) to manage the timing of different CA carriers on behalf of the UE 104. Reliance on network control, however, is not always feasible because in some wireless system communication scenarios, such as V2X in LTE or 5G NR, there may be no network control with respect to management of CA carriers. Additionally, in some examples, one or more UEs 104 (e.g., UE 104-a) may be out of coverage area of the base station 102 as illustrated in FIG. 2.

Aspects of the present disclosure implement techniques that allow the UE 104 to establish communication between the UE 104-a and one or more second UEs 104-b over a set of frequency carriers based on timing and frequency synchronization provided by a synchronization source (e.g., another UE) associated with a synchronization carrier. To this end, in some examples, the first UE 104 (e.g., UE 104-a) may be configured with a set of synchronization carriers (e.g., Set A) in addition to one or more frequency carriers for side link communication 205 between the first UE 104-a and one or more second UEs 104-b.

Upon identifying the set of synchronization carriers (e.g., Set A) configured for the first UE 104, aspects of the present disclosure may further identify the one or more frequency carriers that the first UE 104 is utilizing for side link communication 205. Based on identification of the side link communication frequency carriers, the first UE 104 may determine a subset of synchronization carriers (e.g., Set B) that may be utilized for synchronizing the first UE 104-a. Once the subset of synchronization carriers have been identified, the first UE 104-a may determine the synchronization source associated with each synchronization carrier in the subset of synchronization carriers. For example, a first synchronization carrier in the subset of synchronization carriers may include a synchronization source of a network (e.g., second UE 104-b synchronized directly via the base station 102) while a second synchronization carrier may be synchronized based on GNSS.

A synchronization source associated with a frequency carrier from a set of frequency carriers may be selected according to one or more SLSS sync source selection techniques or rules. Thus, in some examples, the first UE 104-a may prioritize the synchronization source (e.g., base station 102 over GNSS) and select a synchronization carrier from the subset of synchronization carriers based on priority and/or preconfigured rules for synchronization selection.

Thus, the solution described herein may be utilized to enable UEs 104 to autonomously perform V2X CA. Further, in some examples, the synchronization carrier(s) to be searched may be determined based on the SLSS capability of the UE (e.g., transmission and reception of SLSS capabilities of the UE). As such, in some aspects, SLSS signals transmitted by one or more other UEs may be associated with a synchronization source (e.g., a UE 104 that may provide timing and frequency synchronization) to enable the receiving UE 104 to autonomously (e.g., without any, or with minimum, network involvement) manage synchronization of a plurality of carriers for communication with the one or more other UEs 104. To that end, in order to keep the number of different timings within the aggregated carriers to a minimal number, the carriers may be partitioned (or divided) into a different groups of carriers that may be continuous or disjointed carriers in the spectrum. Within each group of carriers, a single synchronization source or reference may be used to synchronize timing and frequency of the group of carriers.

In some aspects, the synchronization reference for V2X CA may be based on GNSS, base station, or an SLSS signal transmitted by other UEs in the network. If the UE 104 is in communication with the GNSS, the UE may prioritize the timing synchronization for CA based on timing and frequency configuration received from GNSS. However, in some instances the UE 104 may be unable to establish communication with the GNSS (e.g., when the UE 104 is underground and does not have signal to GNSS), the UE 104 may need to identify a synchronization source ("sync source") in order to manage timing and frequency of multiple carriers based on the synchronization reference. In some examples, the sync source may be another UE on the network that is in direct or indirect communication with GNSS or a UE 104 that is capable of both receiving and transmitting SLSS (but not in sync with GNSS). In either of these latter two examples, the UE 104 is using the SLSS transmission in a selected carrier of the other UE 104 to synchronize timing within a group of carriers transmitted by the other UE 104, and the selected carrier may be based on the synchronization source.

Identification of the sync source may be based on the SLSS capabilities of the UE. For example, where the UE 104 is capable of SLSS reception (Rx) or transmission (Tx), the UE 104 may be configured to tune to a synchronization search carrier or sync search carrier, which is one of the carriers configured for both reception and transmission, to identify a synchronization source that may provide a timing synchronization reference signal to allow the UE 104 to manage timing and frequency of a plurality of carriers in a group. Alternatively, if the UE 104 is capable of SLSS Rx only, then the sync search carrier may be one of the carriers on which the UE 104 is configured to receive SLSS.

In some examples, identification of which of the plurality of carriers the UE 104 should search for SLSS (e.g., the sync search carrier(s)) and select as the sync carrier may be based on one or more of following techniques:

First, if the UE 104 is able to perform sync source selection for only one carrier (e.g., anchor sync carrier), then that carrier may be pre-configured or network configured such that all UEs on the network may listen to the same carrier for SLSS signal;

Second, in some situations where the UE 104 may be configured to receive a given carrier, then a tune away gap and detection delay requirements may be defined to allow the UE 104 that is not configured to receive (and transmit) in the anchor sync carrier to tune the Rx chain to the anchor carrier to perform SLSS detection, e.g., to support an inter-frequency SLSS selection/reselection procedure during the tune away gaps to find a higher priority sync source; and Third, the UE 104 may loop through all available carriers in the plurality of carriers to identify the highest priority synchronization source based on sync source selection priority rules that are either pre-configured or established by the network. Once a synchronization source is chosen in a certain carrier, the UE may keep reselecting a higher priority sync source within that carrier. Only when the sync source is lost and there is no available fall back sync source would the UE again loop through all available carriers.

With respect to the third option identified above, the priority for the sync source carriers may be set such that the UE 104 may loop through the available carriers in the priority order that is established. As such, if a suitable sync source is found in a carrier with higher priority, the UE may not need to loop through lower priority carriers and may conserve available resources that prevent the UE from having to loop through lower priority carriers.

Figure 3:
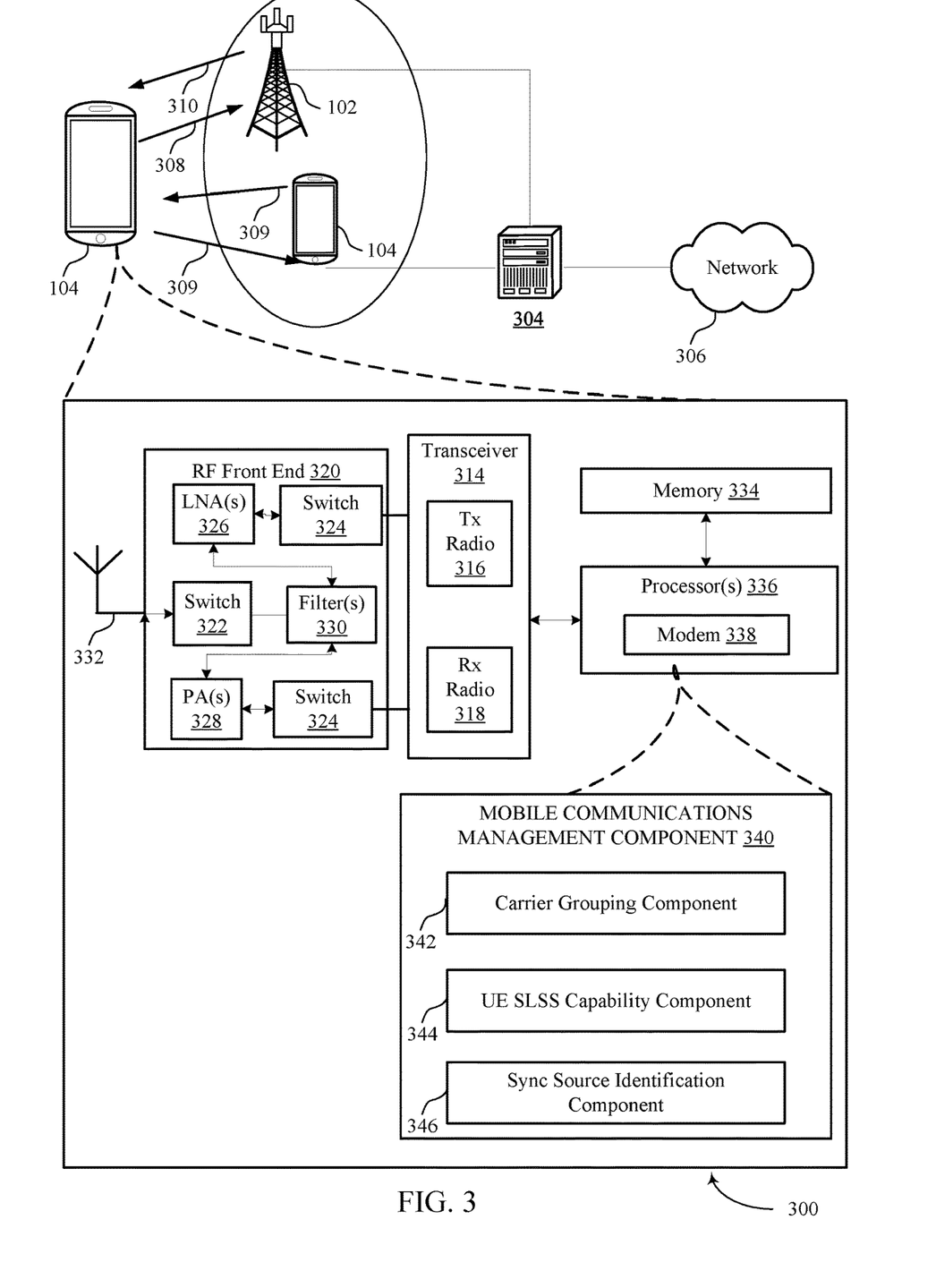
FIG. 3 shows a schematic diagram that supports performing timing and frequency synchronization if a first set of communication carriers based on the synchronization source identified in a second set of communication carriers in accordance with aspects of the present disclosure
Figure 4:
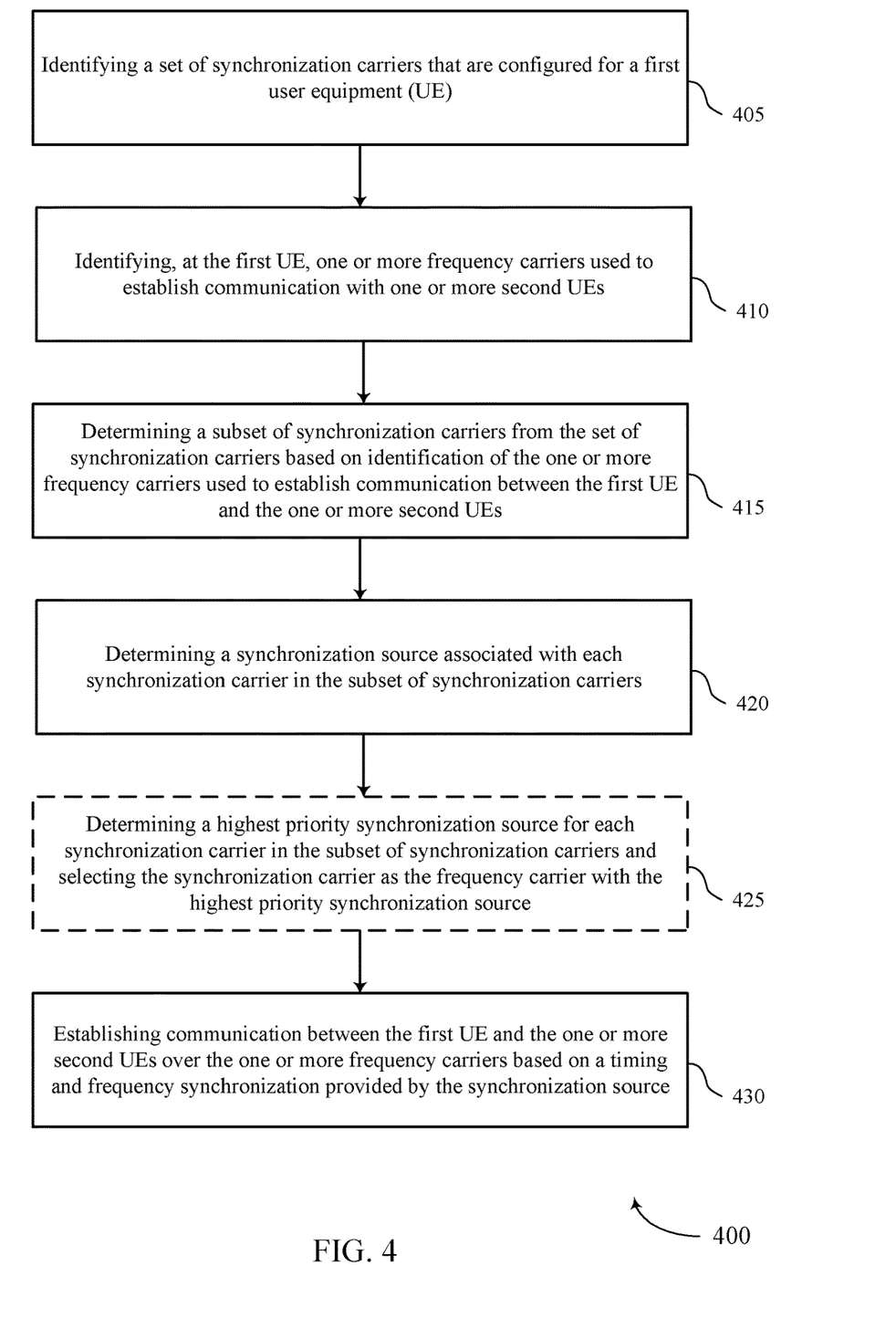
FIG. 4 is a flowchart of a method of wireless communication implemented by a UE.

FIG. 3 describes hardware components and subcomponents of a UE 104 for implementing one or more methods (e.g., method 400) described herein in accordance with various aspects of the present disclosure. For example, one example of an implementation of the UE 104 may include a variety of components, some of which have already been described above, but including components such as one or more processors 336 and memory 334 and transceiver 314 in communication via one or more buses, which may operate in conjunction with the mobile communications management component 340 for performing timing and frequency synchronization of a set or group of frequency carriers based on a synchronization source associated with a selected one of the set or group of frequency carriers.

In some examples, the mobile communication management component 340 may include a carrier grouping component 342 for identifying the partitioning of the plurality of carriers into a plurality of carrier groups where the synchronization source may provide timing and frequency reference for one or more of the plurality of carrier groups. The mobile communication management component 340 may further include UE SLSS capability component 344 for determining the capabilities of the UE 104 to receive and/or transmit SLSS. The UE SLSS capability may be utilized to identify the synchronization search carrier(s) that the UE 104 may tune to in order to identify and select a synchronization source for reference. For example, if the sidelink synchronization capabilities of the first UE allow the first UE to receive SLSS on a first and a second carrier of the plurality of carriers, and transmit the SLSS on a second carrier, in such situation, since the second carrier is common, the UE may tune the first UE to the second carrier as the synchronization search carrier. Alternatively, if the sidelink synchronization capabilities of the first UE allow the first UE to receive SLSS on a first carrier from a plurality of carriers (and not transmit the SLSS), the first UE may set the first carrier as the synchronization search carrier. The mobile communication management component 340 may also include a synch source identification component 346 to identify the synch source from a plurality of UEs 104 on the network based on priorities defined by synch source selection procedure. For example, the synch source may be have a priority order such as, but not limited to, a GNSS, a second UE having direct communication/sync with GNSS, a second UE having indirect communication/indirect sync with GNSS (e.g., a UE receiving a signal from a UE in communication with GNSS), and, finally, a second UE transmitting on its own without any GNSS sync.

The one or more processors 336, modem 338, memory 334, transceiver 314, RF front end 320 and one or more antennas 332, may be configured to support voice and/or data calls (simultaneously or non-simultaneously) in one or more radio access technologies. In an aspect, the one or more processors 336 can include a modem 338 that uses one or more modem processors. The various functions related to mobile communication management component 340 may be included in modem 338 and/or processors 336 and, in an aspect, can be executed by a single processor, while in other aspects, different ones of the functions may be executed by a combination of two or more different processors. For example, in an aspect, the one or more processors 336 may include any one or any combination of a modem processor, or a baseband processor, or a digital signal processor, or a transmit processor, or a receiver processor, or a transceiver processor associated with transceiver 314. In other aspects, some of the features of the one or more processors 336 and/or modem 338 associated with mobile communication management component 340 may be performed by transceiver 314.

Also, memory 334 may be configured to store data used herein and/or local versions of applications or mobile communication management component 340 and/or one or more of its subcomponents being executed by at least one processor 336. Memory 334 can include any type of computer-readable medium usable by a computer or at least one processor 336, such as random access memory (RAM), read only memory (ROM), tapes, magnetic discs, optical discs, volatile memory, non-volatile memory, and any combination thereof. In an aspect, for example, memory 334 may be a non-transitory computer-readable storage medium that stores one or more computer-executable codes defining mobile communication manager component 340 and/or one or more of its subcomponents, and/or data associated therewith, when UE 104 is operating at least one processor 336 to execute mobile communication management component 340 and/or one or more of its subcomponents.

Transceiver 314 may include at least one receiver 318 and at least one transmitter 316. Receiver 318 may include hardware, firmware, and/or software code executable by a processor for receiving data, the code comprising instructions and being stored in a memory (e.g., computer-readable medium). Receiver 318 may be, for example, a radio frequency (RF) receiver. In an aspect, receiver 318 may receive signals transmitted by at least one UE 104. Additionally, receiver 318 may process such received signals, and also may obtain measurements of the signals, such as, but not limited to, Ec/Io, SNR, RSRP, RSSI, etc. Transmitter 316 may include hardware, firmware, and/or software code executable by a processor for transmitting data, the code comprising instructions and being stored in a memory (e.g., computer-readable medium).

Moreover, in an aspect, the UE 104 may include RF front end 320, which may operate in communication with one or more antennas 332 and transceiver 314 for receiving and transmitting radio transmissions, for example, wireless communications transmitted by at least one base station 102 or wireless transmissions transmitted by UE 104. RF front end 220 may be connected to one or more antennas 332 and can include one or more low-noise amplifiers (LNAs) 329 one or more switches 324, one or more power amplifiers (PAs) 328, and one or more filters 330 for transmitting and receiving RF signals.

In an aspect, LNA 326 can amplify a received signal at a desired output level. In an aspect, each LNA 326 may have a specified minimum and maximum gain values. In an aspect, RF front end 320 may use one or more switches 322 to select a particular LNA 326 and its specified gain value based on a desired gain value for a particular application.

Further, for example, one or more PA(s) 328 may be used by RF front end 320 to amplify a signal for an RF output at a desired output power level. In an aspect, each PA 328 may have specified minimum and maximum gain values. In an aspect, RF front end 320 may use one or more switches 324 to select a particular PA 328 and its specified gain value based on a desired gain value for a particular application.

Also, for example, one or more filters 330 can be used by RF front end 320 to filter a received signal to obtain an input RF signal. Similarly, in an aspect, for example, a respective filter 330 can be used to filter an output from a respective PA 398 to produce an output signal for transmission. In an aspect, each filter 330 can be connected to a specific LNA 326 and/or PA 328. In an aspect, RF front end 320 can use one or more switches 322 to select a transmit or receive path using a specified filter 330, LNA 326, and/or PA 328, based on a configuration as specified by transceiver 314 and/or processor 336.

As such, transceiver 314 may be configured to transmit and receive wireless signals through one or more antennas 332 via RF front end 320. In an aspect, transceiver may be tuned to operate at specified frequencies such that transmitting device can communicate with, for example, one or more base stations 102 or one or more cells associated with one or more base stations 102. In an aspect, for example, modem 338 can configure transceiver 314 to operate at a specified frequency and power level based on the configuration of the transmitting device and the communication protocol used by modem 338.

In an aspect, modem 338 can be a multiband-multimode modem, which can process digital data and communicate with transceiver 314 such that the digital data is sent and received using transceiver 314. In an aspect, modem 338 can be multiband and be configured to support multiple frequency bands for a specific communications protocol. In an aspect, modem 338 can be multimode and be configured to support multiple operating networks and communications protocols. In an aspect, modem 338 can control one or more components of transmitting device (e.g., RF front end 320, transceiver 314) to enable transmission and/or reception of signals from the network based on a specified modem configuration. In an aspect, the modem configuration can be based on the mode of the modem and the frequency band in use. In another aspect, the modem configuration can be based on UE configuration information as provided by the network during cell selection and/or cell reselection.

FIG. 4 shows a flowchart 400 that supports synchronizing the timing and frequency for a plurality of carriers in accordance with aspects of the present disclosure. In some examples, UE may execute a set of codes to control the functional elements of the device to perform the described functions. Additionally or alternatively, the system or apparatus may perform aspects of the functions described below using special-purpose hardware.

At block 405, the method may include identifying a set of synchronization carriers (e.g., set A) that are configured for a first UE. Aspects of block 405 may be performed by mobile communication management component 340 described with reference to FIG. 3.

At block 410, the method may include identifying, at the first UE, one or more frequency carriers used to establish communication with one or more second UEs. In some examples, the set of frequency carriers may be partitioned into a plurality of carrier groups. In certain examples, aspects of the described operations may be performed by a mobile communications management component 240, and more specifically the carrier grouping component 242 as described with reference to FIG. 2.

At block 415, the method may include determining a subset of synchronization carriers from the set of synchronization carriers based on identification of the one or more frequency carriers used to establish communication between the first UE and the one or more second UEs. In some examples, the method may include determining the sidelink capabilities of the first UE. In some aspects, the method may include determining that the sidelink synchronization capabilities of the first UE allow the first UE to only receive SLSS on a synchronization carrier (e.g., no capability to transmit SLSS) from a plurality of available set of frequency carriers. In such situations, the first UE may tune the Rx chain to the synchronization search carrier on which the UE is configured to receive SLSS. Additionally or alternatively, the method may include determining that the sidelink synchronization capabilities of the first UE allow the first UE to receive SLSS on a first and a second carrier of the plurality of carriers, and transmit the SLSS on a second carrier. In such situation, the method may include tuning the first UE to the synchronizations search carrier, where the second carrier is set as the synchronization search carrier. In certain examples, aspects of the described operations may be performed by a UE SLSS capability component as described with reference to FIG. 2. Aspects of block 415 may be performed by the mobile communications management component 340 described with reference to FIG. 3.

At block 420, the method may include determining a synchronization source associated with each synchronization carrier in the subset of synchronization carriers. In some examples, the synchronization carrier may be one of the frequency carriers within the set of frequency carriers used to establish communication with the one or more second UEs. The synchronization source may provide timing and frequency reference for one or more of the plurality of carrier groups.

In some examples, determining the synchronization source associated with the synchronization carrier according to the sync source selection procedure may include identifying the sync source as one of GNSS, a base station, or a second UE transmitting SLSS on the second carrier. The method may include selecting the sync source based on pre-determined rules of priorities and configuration for the synchronization carrier.

In some aspects, the method may identify a priority associated with each frequency carrier within the set of frequency carriers, and determining that the sync carrier is a highest priority carrier within the set of communication carriers. Thus, the method may determine that the synchronization source is based on configuration for the synchronization carrier. The priority associated with each frequency carrier within the set of frequency carriers may be configured in the UE using RRC (pre)configuration. For example, if there is network deployment on a carrier, the base station may indicate whether to use eNB as the highest priority or GNSS as the highest priority.

In some aspects, the method may further include identifying a priority of the synchronization source of the synchronization carrier, and periodically searching for a higher priority synchronization source on a different frequency carrier. The different frequency carrier may be within the set of frequency carriers. In such scenario, the method may reselect to the higher priority synchronization source by selecting the different frequency carrier as a new synchronization carrier. The UE may also determine a highest priority synchronization source of each of the frequency carriers within the set of frequency carriers, and selecting the sync carrier as the frequency carrier with the highest priority sync source. In certain examples, aspects of the described operations may be performed by a sync source identification component 346 as described with reference to FIG. 3.

Thus, in some examples, the synchronization carrier may be based on the highest priority carrier. In some aspects, either the GNSS, the base station, or a second UE transmitting SLSS may be the highest priority sync source. Further, the priority of the UEs transmitting SLSS may be additionally determined based on pre-configuration. For example, for a single carrier case, prioritization is preconfigured that establishes priority of synchronization source.

At block 425, the method may optionally include determining a highest priority synchronization source for each synchronization carrier in the subset of synchronization carriers and selecting the synchronization carrier as the frequency carrier with the highest priority synchronization source. Aspects of block 425 may be performed by sync source identification component 346.

At block 425, the method may include establishing communication between the first UE and the one or more second UEs over the set of frequency carriers based on a timing and frequency synchronization provided by the synchronization source. In certain examples, aspects of the described operations may be performed by a mobile communications management component 240 in conjunction with the transceiver 214 as described with reference to FIG. 3.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
    identifying a set of synchronization carriers that are configured for a first user equipment (UE);
    identifying, at the first UE, one or more frequency carriers used to establish communication with one or more second UEs;
    determining a subset of synchronization carriers from the set of synchronization carriers based on identification of the one or more frequency carriers used to establish communication between the first UE and the one or more second UEs, wherein the subset of synchronization carriers comprises multiple synchronization carriers;

determining, for each synchronization carrier in the subset of synchronization carriers, a synchronization source for each synchronization carrier in the subset of synchronization carriers;
selecting one synchronization carrier of the subset of synchronization carriers based on the determined synchronization sources and in accordance with a synchronization source priority; and
establishing communication between the first UE and the one or more second UEs over the one or more frequency carriers based on a timing and frequency synchronization provided by the synchronization source associated with the selected one synchronization carrier.

2. The method of claim 1, wherein the determining the synchronization source further comprises determining a highest priority synchronization source for each synchronization carrier in the subset of synchronization carriers; and wherein selecting one synchronization carrier further comprises selecting the synchronization carrier as the frequency carrier with the highest priority synchronization source.

3. The method of claim 1, wherein the one or more frequency carriers are partitioned into a plurality of carrier groups; and
wherein the synchronization source provides timing and frequency reference for one or more of the plurality of carrier groups.

4. The method of claim 1, wherein determining the synchronization source for each of the synchronization carrier in the subset of synchronization carriers further comprises:
identifying the synchronization source as one of a global navigation satellite system (GNSS), a base station, or a second UE transmitting synchronization signal (SLSS) on the synchronization carrier; and
selecting the synchronization source based on one or both of the priorities or configuration for the synchronization carrier.

5. The method of claim 1, wherein determining the synchronization source for each of the synchronization carrier in the subset of synchronization carriers further comprises:
identifying a priority associated with each synchronization carrier within the set of synchronization carriers;
determining that the synchronization carrier is a highest priority carrier within the set of synchronization carriers; and
determining the synchronization source based on configuration for the synchronization carrier.

6. The method of claim 5, wherein the priority associated with each synchronization carrier within the set of synchronization carriers is configured in the UE using radio resource control (RRC) configuration.

7. The method of claim 1, further comprising:
determining that sidelink synchronization capabilities of the first UE allow the first UE to receive sideline synchronization signals (SLSS) on a first frequency carrier from a plurality of carriers; and
tuning the first UE to a synchronization search carrier, wherein the first frequency carrier is set as the synchronization search carrier based on the sidelink synchronization capabilities.

8. The method of claim 1, further comprising:
determining that sidelink synchronization capabilities of the first UE allow the first UE to receive sideline synchronization signals (SLSS) on a first frequency carrier and a second frequency carrier from the set of frequency carriers, and to transmit the SLSS on the second frequency carrier; and
tuning the first UE to a synchronization search carrier, wherein the second frequency carrier is set as the synchronization search carrier based on the sidelink synchronization capabilities.

9. A user equipment (UE) for wireless communications, comprising:
a processor; and
a memory in communication with the processor, wherein the memory includes instructions executable by the processor to:
identify a set of synchronization carriers that are configured for a first UE;
identify, at the first UE, one or more frequency carriers used to establish communication with one or more second UEs;
determine a subset of synchronization carriers from the set of synchronization carriers based on identification of the one or more frequency carriers used to establish communication between the first UE and the one or more second UEs, wherein the subset of synchronization carriers comprises multiple synchronization carriers;
determine, for each synchronization carrier in the subset of synchronization carriers, a synchronization source for each synchronization carrier in the subset of synchronization carriers;
select one synchronization carrier of the subset of synchronization carriers based on the determined synchronization sources and in accordance with a synchronization source priority; and
establish communication between the first UE and the one or more second UEs over the one or more frequency carriers based on a timing and frequency synchronization provided by the synchronization source associated with the selected one synchronization carrier.

10. The UE of claim 9, wherein the determine the synchronization source further comprises determine a highest priority synchronization source for each synchronization carrier in the subset of synchronization carriers; and wherein the select the synchronization carrier further comprises select the synchronization carrier as the frequency carrier with the highest priority synchronization source.

11. The UE of claim 9, wherein the one or more frequency carriers are partitioned into a plurality of carrier groups; and
wherein the synchronization source provides timing and frequency reference for one or more of the plurality of carrier groups.

12. The UE of claim 9, wherein the instructions to determine the synchronization source for each of the synchronization carrier in the subset of synchronization carriers are further executable by the processor to:
identify the synchronization source as one of global navigation satellite system (GNSS), a base station, or a second UE transmitting synchronization signal (SLSS) on the synchronization carrier; and
select the synchronization source based on one or both of the priorities or configuration for the synchronization carrier.

13. The UE of claim 9, wherein the instructions to determine the synchronization source for each of the synchronization carrier in the subset of synchronization carriers are further executable by the processor to:
identify a priority associated with each synchronization carrier within the set of synchronization carriers;

determine that the synchronization carrier is a highest priority carrier within the set of synchronization carriers; and determine the synchronization source based on configuration for the synchronization carrier.

14. The UE of claim 13, wherein the priority associated with each synchronization carrier within the set of synchronization carriers is configured in the UE using radio resource control (RRC) configuration.

15. The UE of claim 9, wherein the instructions are further executable by the processor to:

determine that sidelink synchronization capabilities of the first UE allow the first UE to receive sideline synchronization signals (SLSS) on a first frequency carrier from a plurality of carriers; and tune the first UE to a synchronization search carrier, wherein the first frequency carrier is set as the synchronization search carrier based on the sidelink synchronization capabilities.

16. The UE of claim 9, wherein the instructions are further executable by the processor to:

determine that sidelink synchronization capabilities of the first UE allow the first UE to receive sideline synchronization signals (SLSS) on a first frequency carrier and a second frequency carrier from the set of frequency carriers, and to transmit the SLSS on the second frequency carrier; and tune the first UE to a synchronization search carrier, wherein the second frequency carrier is set as the synchronization search carrier based on the sidelink synchronization capabilities.

17. A non-transitory computer readable medium for wireless communications comprising code for:

identifying a set of synchronization carriers that are configured for a first user equipment (UE);

identifying, at the first UE, one or more frequency carriers used to establish communication with one or more second UEs;

determining a subset of synchronization carriers from the set of synchronization carriers based on identification of the one or more frequency carriers used to establish communication between the first UE and the one or more second UEs, wherein the subset of synchronization carriers comprises multiple synchronization carriers;

determining, for each synchronization carrier in the subset of synchronization carriers, a synchronization source for each synchronization carrier in the subset of synchronization carriers;

selecting one synchronization carrier of the subset of synchronization carriers based on the determined synchronization sources and in accordance with a synchronization source priority; and establishing communication between the first UE and the one or more second UEs over the one or more frequency carriers based on a timing and frequency synchronization provided by the synchronization source associated with the selected one synchronization carrier.

18. The non-transitory computer readable medium of claim 17, wherein determining the synchronization source further comprises determining a highest priority synchronization source for each synchronization carrier in the subset of synchronization carriers; and wherein selecting the synchronization carrier further comprises selecting the synchronization carrier as the frequency carrier with the highest priority synchronization source.

19. The non-transitory computer readable medium of claim 17, wherein the one or more frequency carriers are partitioned into a plurality of carrier groups; and wherein the synchronization source provides timing and frequency reference for one or more of the plurality of carrier groups.

20. The non-transitory computer readable medium of claim 17, wherein the code for determining the synchronization source for each of the synchronization carrier in the subset of synchronization carriers further comprises code for:

identifying the synchronization source as one of global navigation satellite system (GNSS), a base station, or a second UE transmitting synchronization signal (SLSS) on the synchronization carrier; and selecting the synchronization source based on one or both of the priorities or configuration for the synchronization carrier.

21. The non-transitory computer readable medium of claim 17, wherein the code for determining the synchronization source for each of the synchronization carrier in the subset of synchronization carriers further comprises code for:

identifying a priority associated with each synchronization carrier within the set of synchronization carriers;

determining that the synchronization carrier is a highest priority carrier within the set of synchronization carriers; and determining the synchronization source based on configuration for the synchronization carrier.

22. The non-transitory computer readable medium of claim 21, wherein the priority associated with each synchronization carrier within the set of synchronization carriers is configured in the UE using radio resource control (RRC) configuration.

23. The non-transitory computer readable medium of claim 17, further comprising code for:

determining that sidelink synchronization capabilities of the first UE allow the first UE to receive sideline synchronization signals (SLSS) on a first frequency carrier from a plurality of carriers; and tuning the first UE to a synchronization search carrier, wherein the first frequency carrier is set as the synchronization search carrier based on the sidelink synchronization capabilities.

24. The non-transitory computer readable medium of claim 17, further comprising code for:

determining that sidelink synchronization capabilities of the first UE allow the first UE to receive sideline synchronization signals (SLSS) on a first frequency carrier and a second frequency carrier from the set of frequency carriers, and to transmit the SLSS on the second frequency carrier; and tuning the first UE to a synchronization search carrier, wherein the second frequency carrier is set as the synchronization search carrier based on the sidelink synchronization capabilities.

25. An apparatus for wireless communication, comprising:

means for identifying a set of synchronization carriers that are configured for a first user equipment (UE);

means for identifying, at the first UE, one or more frequency carriers used to establish communication with one or more second UEs;

means for determining a subset of synchronization carriers from the set of synchronization carriers based on identification of the one or more frequency carriers used to establish communication between the first UE and the one or more second UEs, wherein the subset of synchronization carriers comprises multiple synchronization carriers;

means for determining, for each synchronization carrier in the subset of synchronization carriers, a synchronization source for each synchronization carrier in the subset of synchronization carriers;

means for selecting one synchronization carriers based on the determined synchronization sources and in accordance with a synchronization source priority; and means for establishing communication between the first UE and the one or more second UEs over the one or more frequency carriers based on a timing and frequency synchronization provided by the synchronization source associated with the selected one synchronization carrier.

26. The apparatus of claim 25, wherein the means for determining the synchronization source further comprises means for determining a highest priority synchronization source for each synchronization carrier in the subset of synchronization carriers; and wherein the means for selecting the synchronization carrier further comprises means for selecting the synchronization carrier as the frequency carrier with the highest priority synchronization source.

27. The apparatus of claim 25, wherein the one or more frequency carriers are partitioned into a plurality of carrier groups; and wherein the synchronization source provides timing and frequency reference for one or more of the plurality of carrier groups.

28. The apparatus of claim 25, wherein the means for determining the synchronization source for each of the synchronization carrier in the subset of synchronization carriers further comprises:

means for identifying the synchronization source as one of global navigation satellite system (GNSS), a base station, or a second UE transmitting synchronization signal (SLSS) on the synchronization carrier; and means for selecting the synchronization source based on one or both of the priorities or configuration for the synchronization carrier.

29. The apparatus of claim 25, wherein the means for determining the synchronization source for each of the synchronization carrier in the subset of synchronization carriers further comprises:

means for identifying a priority associated with each synchronization carrier within the set of synchronization carriers;

means for determining that the synchronization carrier is a highest priority carrier within the set of synchronization carriers; and means for determining the synchronization source based on configuration for the synchronization carrier.

30. The apparatus of claim 29, wherein the priority associated with each synchronization carrier within the set of synchronization carriers is configured in the UE using radio resource control (RRC) configuration.

* * * * *